Figure 1:
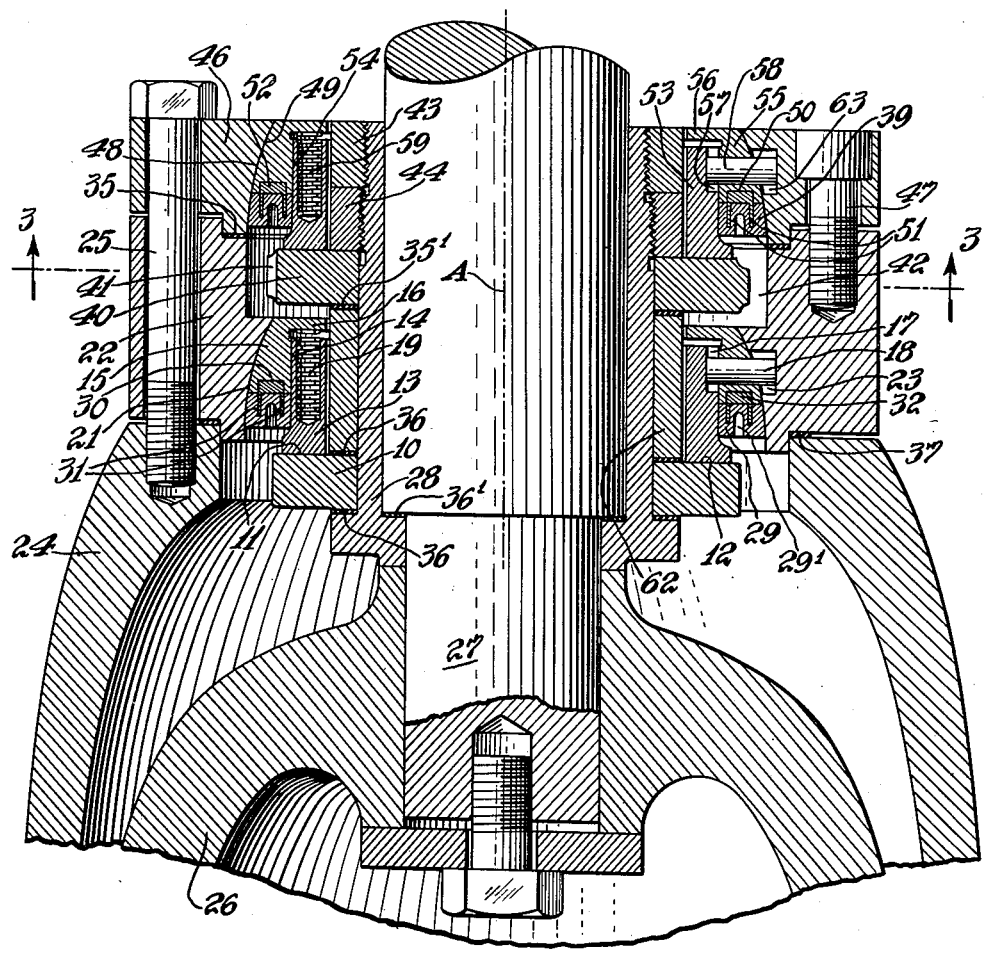

July 1, 1952

D. R. LEWIS 2,601,997

SEALING DEVICE

Filed July 9, 1949

2 SHEETS—SHEET 1

INVENTOR.
DOUGLAS R. LEWIS
BY
ATTORNEY

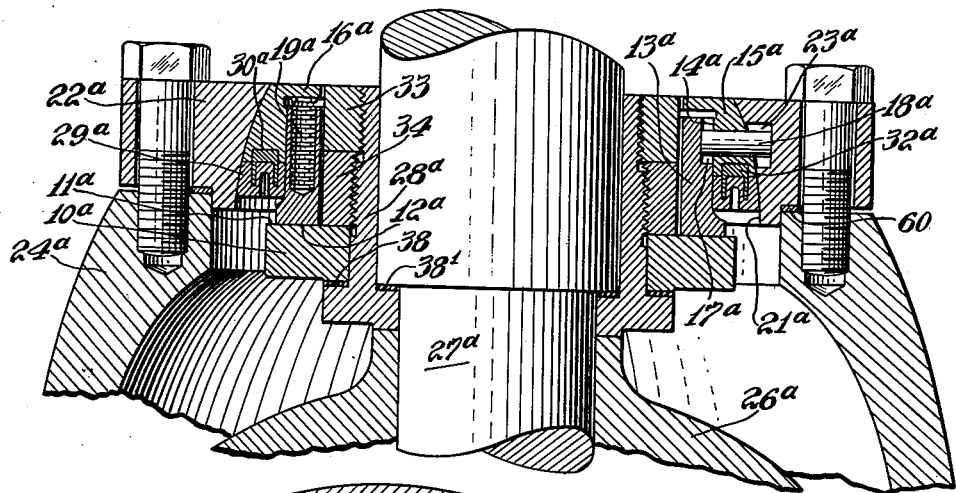
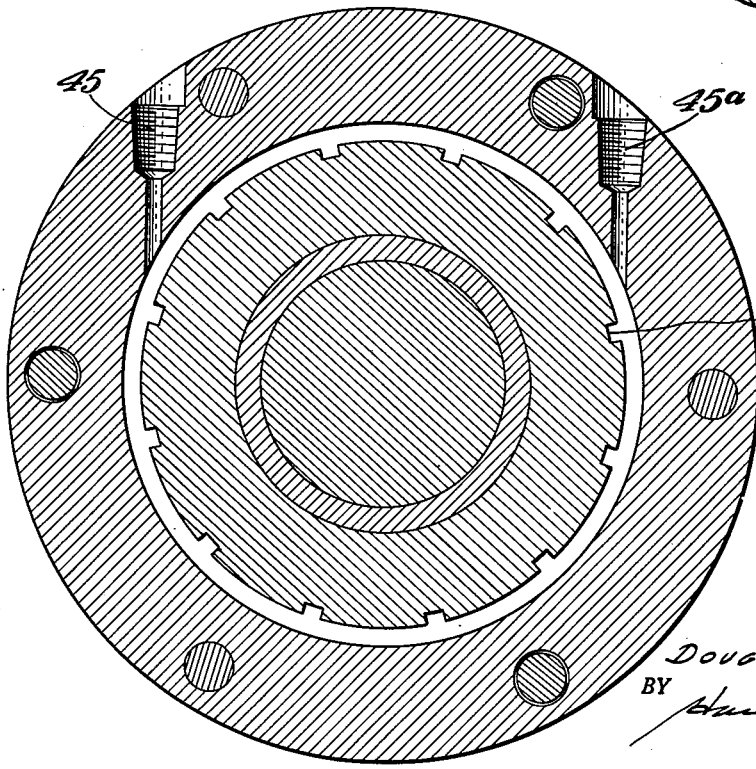

Patented July 1, 1952

2,601,997

UNITED STATES PATENT OFFICE 2,601,997

SEALING DEVICE

Douglas R. Lewis, Summit, N. J., assignor, by mesne assignments, to The Viscoseal Corporation, Union, N. J., a corporation of New Jersey Application July 9, 1949, Serial No. 103,836

10 Claims. (Cl. 286—11.14)

This invention relates to sealing devices, and more particularly to a device for sealing the interface defined by surfaces having relative movement. The device is adapted for use in such applications as, for example, autoclaves, pumps, mixers, and the like, to seal one part against another not in synchronous movement therewith, and for other uses. It is adapted, for example, for use in sealing a shaft to the wall through which the same passes. The device of my invention embodies self-aligning elements which reduce wearing of the parts, in operation, to a minimum.

These and other advantageous objects, which will appear from the drawings, and from the description hereinafter, are accomplished by the structure of my invention, of which embodiments are illustrated in the drawings. It will be apparent, from a consideration of said drawings, and the following description, that the invention may be embodied in other forms suggested thereby; such other forms as come within the scope of the appended claims are to be considered within the scope and purview of the instant invention.

In the drawings:

Fig. 1 is a medial vertical sectional view of a sealing device embodying my invention, Fig. 2 is a similar view of another form of the invention, and Fig. 3 is a horizontal sectional view, taken on line 3—3 of Fig. 1.

Fig. 1 illustrates the application of my invention to a rotated member, such as rotor 10, which is provided with a face 11, disposed at an angle, which, in the drawings, is shown to be substantially 90° to its axis of rotation, to be sealed against a non-rotating surface 12. Surfaces 11 and 12 may be disposed at any other desired or convenient angle, as, for example, an acute or an obtuse angle, or may have an outline other than that shown in Fig. 1, without affecting the operation of the invention. The surface 12 is, in the structure shown in the drawings, the lower face of sliding stator ring 13, and constitutes, with the rotor face 11 with which it is constantly in contact, as hereinafter set forth, the interface to be sealed. The sliding stator ring 13 is adapted to have limited sliding movement in the recessed portion 14 of an open ball member 15 having an upper ledge 16 overhanging the recessed portion 14. The stator ring 13 is provided with a keyway 17 to receive the key 18 which is fixed to the ball member 15 and permit said key to have limited movement therein. Springs 19, or other or equivalent separating or tension means, are interposed between the ring 13 and the ledge 16 of the ball 15, to constantly urge the ring 13 into contact with the rotor 10. The ball member 15 is provided with an outer wall, preferably of arcuate outline, which has sliding contact with the inner wall 21 of the barrel member 22 of corresponding outline. The barrel member is provided with a keyway 23 to receive the key 18 and permit the same to have limited movement therein. Thus, the parts 13, 15 and 22 are keyed against relative movement in one plane, while permitting of the limited movement of the parts in another plane which is at right angles to the one plane, as will be apparent from a consideration of the drawings.

The barrel member 22 is secured to the pressure vessel wall or other device or support 24 to which the invention is applied, by bolt or similar means 25.

The sealing device of my invention is shown, in Fig. 1, applied to said support 24, and shaft 27, passed therethrough. The member 26 is a mixer, impeller, or similar part, rotating within support 24, in unison with the sleeve 28 on the shaft 27, in the form shown in Fig. 1 by way of example.

The ball member 15 may be provided with a resilient cup 29 fixed thereto in any desired or convenient manner, as, for example, by providing the ball member 15 with an undercut portion 30, fixing strips 31 in said undercut portion 30, and locking the strips 31 therein by an expander wedge 32 or the like. Pressure groove 29' is cut in the cup ring 29 so that increments in pressure will force the sides of the cup tightly against the sliding stator ring 13 and the arcuate wall 21 of the barrel 22.

The parts thus far described are shown in Fig. 1, and again in Fig. 2, wherein they bear the reference numerals above given, having appended thereto the suffix "a." In Fig. 2, the rotor 10a is shown secured to the sleeve 28a by means 33, 34 engaging the correspondingly threaded portion of the sleeve 28a. The nut means 33, 34 preferably comprise left and right-hand nut members, to counteract any unthreading tendency on rotation of the shaft in either direction.

In the form shown in Figs. 1, an outer seal section is provided, comprising a rotor 40 positioned on the spacer 62, rotor 40 and spacer 62 being held on the rotor 10 by nut means 43, 44 engaging correspondingly threaded portions of the sleeve 28. The nut means 43, 44 are preferably of the left-hand and right-hand type, so as to counteract any unthreading tendency on rotation of the shaft in either direction. The barrel 22 may be provided with pipe plug apertures 45, 45a (Fig. 3) from the cavity 42 to the outer circumference of the barrel 22. There may be connected to the outer ends of apertures 45, 45a a fluid or other sealing medium or reservoir. The apertures 45, 45a communicate with the cavity 42 at spaced, substantially tangential points, and the rotor 40 is preferably circumferentially notched, as indicated at 41. Thus, the rotor 40 will, on rotation, set up a vortex within the cavity 42 of the barrel 22; this vortex will circulate the fluid or other medium coupled to the connections 45, 45a. The cavity 42 may be filled with a liquid of proper viscosity, surface tension, vapor pressure, and wetting ability. The cavity being completely filled, and its liquid having very low compressibility, the slightest penetration of the fluid in the vessel across the interface defined by surfaces 11 and 12 will raise the pressure of the cavity liquid, and the pressure drop across the interface will be zero. There is now no tendency for either the liquid in the cavity or the fluid in the vessel to move across the interface. There is full pressure drop across the upper, or outer, seal, but that interface has only to confine a liquid which was selected beforehand with special attention to the ease with which it could be sealed, and it is no problem. Thus, there is interposed between the inside and outside of the vessel a completely inelastic cork consisting of a liquid of proper qualities for such a purpose. As above noted, a velocity is imparted to the liquid in the cavity when the shaft turns; by means of the two parallel holes (45, 45a) entering the same half of the cavity nearly tangentially, a pumping action is produced.

Plate 46 is bolted or otherwise secured to the barrel 22 as at 47, said plate having an inner arcuate wall 48 adapted to be slidably engaged by the outer wall 49 of the ball member 55 of corresponding outline. Said ball member is provided with a recessed portion 54 with which the stator ring 53 is adapted to have sliding engagement and is provided with an upper ledge 56 overhanging the sliding stator ring 53. Spring or other separating or tension means 59 are interposed between the upper ledge 56 and stator ring 53 to yieldably urge the latter against the rotor 40. A resilient cup 39 is secured to the ball member 55 and contacts the plate 46 and the stator ring 53, said resilient cup 39 being secured to the ball member 55 by any suitable means such as, for example, by metallic strips 51 secured within the undercut portion 50 of the ball member by the expander ring 52. The sliding stator ring 53 is keyed to the plate 46 by the key 58 which is received in keyways 57 and 63 in the sliding stator ring 53 and plate 46 respectively, to key the parts 46, 55 and 53 together against independent rotary movement in the plane of faces 11 and 12, while permitting of the movement thereof in a plane at right angles thereto. The device may be provided with suitable gaskets 35, 35', 36, 36' and 37, and with gasket 60 between the barrel 22a, and the fixed device 24a, and gaskets 38, 38' between the sleeve 28a, shaft 27a and rotor 19a, in the form shown in Fig. 2.

From the foregoing, it will be noted that the sealing device of my invention embodies features of self-alignment operative from the very first revolution, reducing wearing of the parts to a minimum, and providing a constant, effective seal at the interface.

The drawings and description set forth certain practical applications of the invention, which may well be embodied in other forms suggested thereby. Such other forms as fall within the scope of the appended claims shall be deemed to be within the purview of the instant invention.

Having thus described by invention, what I claim as new and desire to secure by Letters Patent is:

1. In a device for sealing a rotated member having a face disposed at an angle to its axis of rotation, a ball member slidably disposed in said device, said ball member having a recessed portion and a ledge portion overhanging said recessed portion, a stator ring positioned in the recessed portion of the ball member underlying said ledge in slidable engagement with the ball member and projecting, at one end, from said ball member, and spring means engaging the ledge and stator ring, urging the projecting end of the stator ring into contact with said face of the rotated member, while the stator ring slidably engages the recessed portion to seal the face.

2. In a device for sealing a rotated member having a face disposed at an angle to its axis of rotation, a ball member slidably disposed in said device, said ball member having a recessed portion and a ledge portion overhanging said recessed portion, a stator ring positioned in the recessed portion of the ball member and slidably engaging the ball member, means between the ledge and stator ring, urging the stator ring into contact with the face of the rotated member to seal the same, and keyway means in the device to key the ball and stator ring against rotation in a plane parallel to the plane of the face while providing for limited movement thereof in a plane at right angles thereto, said keyway means comprising a key fixed to the ball member and keyways in the stator ring and in the device freely receiving said key for movement in the last mentioned plane.

3. In a device for sealing a rotated member having a face disposed at an angle to its axis of rotation, an open barrel member adapted to be secured to a fixed support, said barrel member having an inner wall, a ball member having an outer wall of outline complementary to that of the inner wall of the barrel member and adapted to have sliding engagement therewith, and having an inner recessed portion, a stator ring disposed in said recessed portion in slidable engagement therewith and partly projecting from said ball member, and means in said device engaging the stator ring and ball member and urging the projecting end of the stator ring into contact with said face.

4. In a device for sealing a rotated member having a face disposed at an angle to its axis of rotation, a barrel member adapted to be secured to a fixed support, said barrel member having a cavity, means engaging the barrel member and face, closing the lower end of the cavity, an end plate positioned on said barrel, a ball member slidably engaging said plate, a rotor secured to said rotated member and projecting into the cavity, a stator ring engaging the ball member and rotor, and means engaging said stator ring and urging the same into contact with the rotor to seal the latter.

5. In a device for sealing a rotated member having a face disposed at an angle to its axis of rotation, a barrel member adapted to be secured to a fixed support, said barrel member having a cavity, means engaging the barrel member and face, closing the lower end of the cavity, an end plate positioned on said barrel, a ball member slidably engaging said plate, a rotor secured to said rotated member and projecting into the cavity, a stator ring engaging the ball member and rotor, and means engaging said stator ring and urging the same into contact with the rotor to seal the latter, said rotor having a circumferentially notched portion, whereby, on rotation of the rotor, a velocity is imparted to the medium in the cavity, and a pumping action is produced.

6. In a device for sealing a rotated member having a face disposed substantially at an angle to its axis of rotation, an open barrel member adapted to be secured to a fixed support, a ball member slidably engaging the barrel member, a stator ring slidably engaging the ball member, tension means in said device engaging the stator ring and urging the same into contact with one face of the rotated member to seal the latter, an end plate positioned on said barrel, said barrel having a cavity, a rotor secured to said rotated member, and projecting into the cavity and means slidably engaging the end plate and yieldably engaging the rotor to seal the same.

7. In a device for sealing a rotated member having a flat surface disposed at an angle to its axis of rotation, an open barrel member adapted to be secured to a fixed support, said barrel member having an inner wall of concave outline, a ball member having an outer wall of an outline complementary to that of the inner wall of the barrel member and adapted to have sliding engagement therewith and having a central opening, a stator ring positioned in said opening and slidably engaging the same, and means engaging the stator ring and urging the same into contact with the face of the rotated member to seal the same.

8. In a device for sealing a rotated member having a flat surface disposed at an angle to its axis of rotation, a barrel member adapted to be secured to a fixed support, said barrel member having a cavity and having an inner wall of concave outline, a ball member having an outer wall of an outline complementary to that of the inner wall of the barrel member and adapted to have sliding engagement therewith, a stator ring slidably engaging the ball member, means engaging the stator ring and urging the same into contact with the face of the rotated member to seal the same, an end plate positioned on said barrel, a second ball member slidably engaging said plate, a rotor secured to said rotated member and projecting into the cavity, a second stator ring engaging said second ball member and rotor, and means engaging said stator ring and urging the same into contact with the face of said rotor to seal the same.

9. In a device for sealing a rotated member having a flat surface disposed at an angle to its axis of rotation, an open barrel member adapted to be secured to a fixed support, said barrel member having an inner wall of concave outline, a ball member having an outer wall of an outline complementary to that of the inner wall of the barrel member and adapted to have sliding engagement therewith, a stator ring slidably engaging the ball member, means engaging the stator ring and urging the same into contact with the face of the rotated member to seal the same, an end plate positioned on said barrel, said end plate having an inner wall of concave outline, a second ball member having an outer wall of an outline complementary to that of the inner wall of the end plate and adapted to have sliding engagement therewith, said second ball member having a recessed portion and a ledge overhanging said recessed portion, a rotor secured to said rotated member, a second stator ring positioned in and slidably engaging the recessed portion of said second ball member, and spring means engaging said ledge and the last mentioned stator ring urging the latter into contact with the rotor to seal the same.

10. In a device for sealing a rotated member having a face disposed at an angle to its axis of rotation, a ball member slidably disposed in said device, said ball member having a recessed portion, a stator ring positioned in the recessed portion of the ball member and slidably engaging the ball member, means between the ball member and stator ring, urging the stator ring into contact with the face of the rotated member to seal the same, and keyway means in the device to key the ball and stator ring against rotation in the plane of the face while providing for limited movement thereof in a plane at right angles thereto, said keyway means comprising a key fixed to the ball member and keyways in the stator ring and in the device freely receiving said key for movement in the last mentioned plane.

DOUGLAS R. LEWIS.

REFERENCES CITED

The following references are of record in the file of this patent:

UNITED STATES PATENTS

| Number | Name | Date |
|---|---|---|
| 1,602,177 | Spreen | Oct. 5, 1926 |
| 1,677,262 | Wintroath | July 17, 1928 |
| 1,787,459 | Tawresy | Jan. 6, 1931 |
| 2,007,414 | Weis | July 9, 1935 |
| 2,365,046 | Bottomley | Dec. 12, 1944 |

FOREIGN PATENTS

| Number | Country | Date |
|---|---|---|
| 3,661 | Great Britain | of 1881 |
| 322,403 | France | Oct. 3, 1902 |